United States Patent [19]
McMurtrey et al.

[11] Patent Number: 5,531,511
[45] Date of Patent: Jul. 2, 1996

[54] BICYCLE HUB CONE NUT LOCKING ARRANGEMENT

[75] Inventors: David K. McMurtrey; Dennis P. Pawsat, both of Maysville, Ky.

[73] Assignee: Wald Manufacturing Co., Inc., Maysville, Ky.

[21] Appl. No.: 311,200

[22] Filed: Sep. 23, 1994

[51] Int. Cl.$^6$ .................................................. B60B 27/02
[52] U.S. Cl. ................................ 301/110.5; 301/105.1; 441/938
[58] Field of Search .................. 384/545; 411/938; 301/110.5, 110.6, 105.1; 29/894

[56] References Cited

U.S. PATENT DOCUMENTS

| | | | |
|---|---|---|---|
| 910,678 | 1/1909 | Hardin . | |
| 1,216,431 | 2/1917 | Frazier . | |
| 2,246,492 | 6/1941 | Aldridge . | |
| 2,290,451 | 7/1942 | Schwinn . | |
| 3,131,008 | 5/1962 | Dian | 308/192 |
| 3,428,377 | 2/1969 | Christian et al. . | |
| 3,479,675 | 11/1969 | Ricca | 411/938 |
| 3,858,942 | 1/1975 | Humlong | 301/105 |
| 3,871,710 | 3/1975 | Dian et al. . | |
| 5,292,287 | 3/1994 | Hsieh . | |

FOREIGN PATENT DOCUMENTS

| | | | |
|---|---|---|---|
| 1367662 | 6/1964 | France | 301/110.5 |

Primary Examiner—David M. Mitchell
Assistant Examiner—Jonathan J. Yun
Attorney, Agent, or Firm—Wood, Herron & Evans

[57] ABSTRACT

A front hub assembly of a bicycle wheel having an improved cone nut locking mechanism includes a hub body having a bore therethrough and an axle extending through the bore having threaded ends. The axle includes first and second resistance portions formed adjacent respective threaded end to offer resistance to a cone nut being threaded onto the threaded end. The magnitude of the resistance of the first resistance portion is greater than the magnitude of resistance of the second resistance portion such that a first cone nut can be threaded onto the resistance portion a first predetermined distance and located and a second cone nut may subsequently be threaded onto the second resistance portion a second predetermined distance and locked without rotating the axle and further threading the first cone nut onto the first resistance portion.

12 Claims, 1 Drawing Sheet

BICYCLE HUB CONE NUT LOCKING ARRANGEMENT

FIELD OF THE INVENTION

This invention relates generally to hub assemblies for bicycle wheels and particularly to apparatus and method for locking cone nuts onto an axle to ensure proper bearing adjustment and assembly of the bicycle wheel.

BACKGROUND OF THE INVENTION

Hub assemblies for bicycle wheels, and in particular hub assemblies for the front wheel of a bicycle have traditionally utilized ball bearing structures as a way of providing rotational movement of the hub and wheel with respect to a stationary or fixed axle. To that end, the hub body of a traditional hub assembly includes a center section with hub flanges attached at either end and a hollow bore extending therethrough. The wheel axle extends through the hollow bore and has threaded ends. The hub flanges include openings around their periphery for accepting one end of the wheel spokes while the flange also serves as an outer or a rotating bearing race to hold the hub bearing structures. Cone nuts are threaded onto each end of the axle and hold the ball bearing structures within the respective hub flange. Portions of the cone nuts also serve as inner or stationary bearing races. The threading of the cone nuts onto the axle determines the force in which the bearing structure is held in the bearing race of the hub flange.

Accordingly, in the manufacture of a hub assembly, one of the operational steps involves advancing the cone nuts onto the threaded axle ends until the proper bearing adjustment is achieved between the inner and outer bearing races. The proper bearing adjustment must be maintained during the packaging and shipping of the hub to a bicycle manufacturer, during the building of the bicycle wheel by the bicycle manufacturer, and during shipping of the finished bicycle to a retailer. The retailer, and sometimes the end consumer, are customarily required to assemble the front bicycle wheel to the front fork after they have purchased the bicycle.

Attachment of the front wheel to the front fork of the bicycle requires correct positioning of each end of the axle into the corresponding ends of the front fork. Additionally, components such as wheel retainers, fender braces and other parts are installed onto the ends of the axle, and then two outside nuts are assembled onto each end of the axle to secure the wheel and hub to the fork. If the hub bearing structure has developed unacceptable looseness or play after a normal period of usage, the cone nuts may be re-adjusted by first loosening the outside nuts which attach the front wheel to the fork and adjusting the cone nuts. The outside nuts may then be retightened.

Generally, during assembly of a bicycle hub, the cone nuts are advanced onto the threaded end portions of the axle which extend beyond both ends of the hub body. Once the cone nuts have been threaded into their final adjusted position and the bearing structures are secured to the outer bearing races within the hub flanges, the cone nuts are locked or otherwise fixed at that position. Various ways of locking the cone nuts into position on a bicycle axle have been developed. The method of Schwinn U.S. Pat. No. 2,290,451 utilizes two separate lock nuts which must be tightened against each cone nut. A second locking method is generally illustrated in Dian U.S. Pat. No. 3,131,008, Christian et al.; U.S. Pat. No. 3,428,377; and Humlong U.S. Pat. No. 3,858,942. These patents discuss manufacturing an axle in such a way as to provide resistance which the internal threads of the cone nuts must encounter prior to reaching their final adjusted position. Alternatively, Hsieh U.S. Pat. No. 5,292,287 makes one cone nut an integral part of the axle while the other cone nut is threaded on the axles.

One of the most economical ways to manufacture a bicycle hub assembly and to lock the cone nuts into their final adjusted position such that they may be easily re-adjusted before and after assembly to a bicycle fork is to independently tighten each cone nut onto the axle. For example, the first method discussed above requires two additional lock nuts. The third method requires forming the first cone nut as an integral part of the axle, and after the integral cone nut is formed, threading of the axle is made more difficult. Furthermore, the third method limits the bearing adjustment of the hub assembly once it is installed on the bicycle, because only one cone nut is adjustable.

In assembling a bicycle hub wherein the cone nuts are independently adjustable and lockable, the first cone nut is threaded onto the first threaded end of the axle and is stopped at a predetermined distance from the endmost point of the axle. The second cone nut is advanced onto the second threaded end of the axle, meeting axle resistance, and advancement of the second cone nut is ceased when the proper bearing adjustment is obtained in the hub assembly. While the second cone nut is being advanced on the threaded end of the axle, the axle and first cone nut are held stationary and kept from rotating by holding the first cone nut at its wrench flats. When the hub assembly is complete, the hub should preferably have the two threaded ends of the axle extending approximately equal distances past the cone nuts.

However, achieving equal extension of the axle ends past the two cone nuts is often difficult. Frequently, when the second cone nut is being advanced on the axle the resistance encountered by that cone nut is greater than the resistance which was encountered by the first cone nut. When that occurs, the second cone nut ceases to turn with respect to the axle and additional rotation of the second cone nut causes the axle to rotate instead with respect to the first cone nut. When the rotation of the second cone nut is ceased because the proper bearing adjustment is obtained, the constructed hub assembly has two threaded axle ends which extend different amounts past the two cone nuts. This could provide difficulty in assembling the bicycle wheel to the front fork of a bicycle.

Accordingly, there is a need for a hub assembly in which an axle may be secured with independently rotating cone nuts and which consistently yields a completed hub with an axle that projects equal amounts past the two cone nuts. Further, it may be desirable to have different predetermined lengths of the axle projecting past the cone nuts. The predominant solution has been to physically restrain the first cone nut and physically restrain the axle in order to prevent the first cone nut from advancing any further onto the axle. As may be appreciated, restraining the axle further complicates the assembly process. Therefore, it is an objective of the present invention to provide a hub assembly which utilizes independently adjusted cone nuts which may be assembled with an axle into a completed hub and which will yield equal extension of the axle ends with respect to both of the cone nuts. It is another objective to provide such a hub assembly which may be assembled easily, efficiently, and without requiring that the axle be restrained during assembly.

SUMMARY OF THE INVENTION

These objectives are met by a front hub assembly of a bicycle wheel having an improved cone nut locking mechanism. The hub assembly of the present invention includes a hub body having a bore formed therethrough and an axle which extends through the bore. The axle has threaded ends and includes first and second resistance portions or sections which are formed on the axle adjacent the respective threaded ends. The resistance portions or sections offer resistance to the rotation of a cone nut which is threaded onto the threaded end of the axle. The magnitude of resistance of the first resistance portion to one of the threaded cone nuts is greater than the magnitude of resistance of the second resistance portion to the other respective cone nut. The one cone nut is threaded onto the first resistance portion a predetermined distance and is rotated onto the first resistance portion and locked thereon. After the hub body has been slipped around the axle with the various hub bearing structures in place, the second cone nut is subsequently threaded onto the second resistance portion. The second cone nut is threaded approximately the same predetermined distance as the first cone nut and is rotated onto the second resistance portion and locked thereon. Since the magnitude of resistance of the first resistance portion to rotation of the first cone nut is greater than that of the second resistance portion, the second cone nut may be threaded onto the second resistance portion without overcoming the magnitude of resistance of the first resistance portion. Therefore, the axle is prevented from rotating with the second cone nut and is prevented from further being threaded into the first cone nut greater than the predetermined distance. This allows the cone nuts to be readily and efficiently threaded onto the axle equal distances. Furthermore, the resistance portions lock the cone nuts onto the axle and prevent loosening of the cone nuts and improper adjustment of the bearing structures in the hub assembly.

In one embodiment of the present invention, the first resistance portion includes a plurality of elongated flutes which project radially from around the axle and are oriented generally parallel to the longitudinal axis of the axle. The second resistance portion includes a plurality of deformed threads on the axle threaded end. Preferably, one threaded end of the axle is created with more threads than the other threaded end, and a portion of the threads are deformed to provide resistance to the cone nut. Alternatively, the first resistance portion might be formed by leaving a section of the axle end unthreaded such that the cone nut threads contact the unthreaded section. In still another embodiment, the first resistance portion might include a section having threads with a different pitch or a greater pitch diameter than the threads on the threaded axle end. Still further, the first resistance portion might include threads having locking chemicals thereon in order to increase the magnitude of resistance to the cone nut with respect to the magnitude of resistance of the second resistance portion.

In another alternative embodiment of the present invention; the varying magnitudes of resistance between the first resistance portion and the second resistance portion are created by spacing the resistance portions at different distances from endmost points of the axle. That is, the first resistance portion originates at a first predetermined distance from the first endmost point and the second portion originates at a second predetermined distance from the second endmost point. The first predetermined distance is less than the second predetermined distance so that the first cone nut encounters resistance while being threaded onto one end sooner than the second cone nut encounters resistance while being threaded onto the other end. This allows the first cone nut to be threaded and locked and the second cone nut to be subsequently threaded and locked without rotating the axles farther into the first cone nut. In this alternative embodiment, both resistance portions might utilize similar resistance structures, such as flutes, deformed threads or the like.

Further details and features of the present invention will become more readily apparent from the Brief Description of the Figures and the Detailed Description of the Invention below.

BRIEF DESCRIPTION OF THE DRAWINGS

The accompanying drawings, which are incorporated in and constitute a part of this specification, illustrate the preferred embodiment of the invention and, together with a general description of the invention given above, and the detailed description given below, serve to explain the principles of the invention.

DETAILED DESCRIPTION OF THE INVENTION

Figure 1:
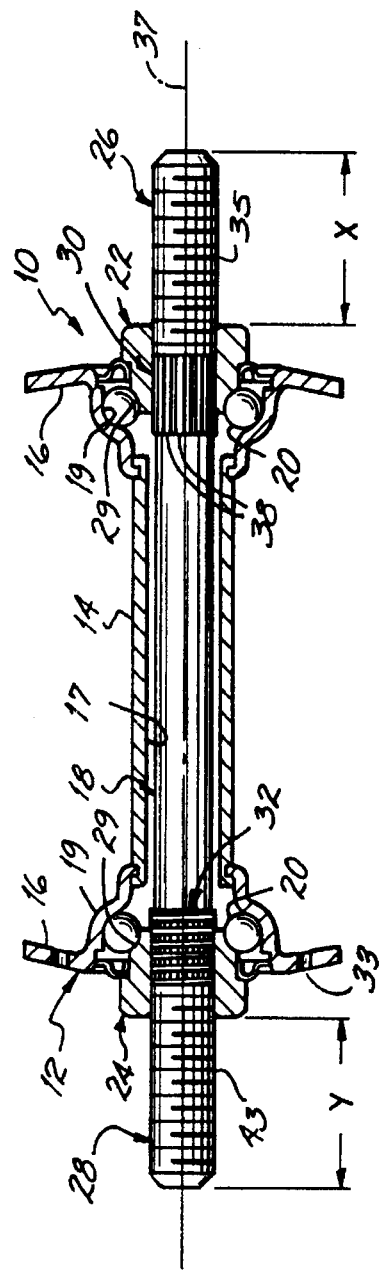
FIG. 1 shows a hub assembly of a bicycle, in partial cross-section, utilizing the improved cone nut locking mechanism of the present invention.

FIG. 1 shows the front hub assembly of a bicycle wheel having the improved cone nut locking mechanism of the present invention. Hub assembly 10 includes a hub body 12 with a center section 14 and hub flanges 16 positioned at either end of the center section 14. Hub body 12 has an internal bore 17 therethrough which extends through the center section 14 and through openings in each flange 16. An axle 18 extends through bore 17 longitudinally with body 12 and extends through the flange openings and past the ends of the flange. Each flange 16 forms an outer bearing race 19 which receives circular bearing structures 20 therein. Bearing structures 20 surround the axle 18. Cone nuts 22, 24 are threaded onto the threaded ends or end sections 26, 28, respectively, of axle 18. The cone nuts 22, 24 include inner bearing races 29 which cooperate with outer bearing races 19 to hold the ball bearing structures 20 within the hub body 12 so that body 12 may rotate around axle 18. Cone nuts 22, 24 are threaded onto the threaded ends 26, 28 until they reach the respective first resistance portion or section 30 and second resistance portion or section 32.

The cone nuts are rotated onto the threaded ends or end sections 26, 28 and against the bearing structures 20 to seat the bearing structures within the complementary races 19, 29 with the proper amount of force. Too much force will prevent the bearings from rotating around the axle, and too little force yields a sloppy rotation of the hub assembly. When assembled properly, the hub assembly 10 shown in FIG. 1 provides smooth, easy rotation of the hub body 12 around stationary axle 18. Axle 18 is secured to the front fork of a bicycle while the flanges 16 of hub body 12 include holes or openings 33 which extend circumferentially therearound and are dimensioned to receive one end of the front wheel spokes (not shown) when the front wheel is assembled.

Figure 2:
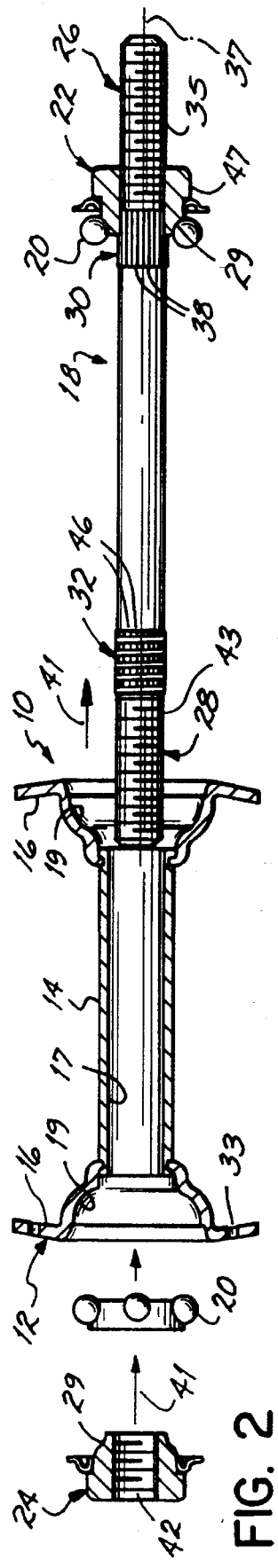
FIG. 2 is a disassembled view of the front hub assembly of FIG. 1.

When hub assembly 10 is assembled, generally one cone nut will be threaded onto and fixed at one end of the axle and subsequently the other cone nut will be threaded onto the axle after the axle has been inserted into the bore of the hub body. Referring now to FIG. 2, cone nut 22 is threaded onto the threaded end 26 of axle 18. The threads 35 of the threaded end 26 generally have the same pitch as the threads of cone nut 22. Therefore, the cone nut readily and smoothly rotates and advances along threaded end 26. The first resistance portion or section 30 is adjacent end 26 and provides a magnitude of resistance to the rotational advancement of cone nut 22 on the threaded end 26. In one embodiment of the present invention, the first resistance portion includes radially projecting elongated flutes which project around the axle and are oriented to extend generally parallel a longitudinal axis 37 of the axle 18. The projecting flutes 38 are formed in axle 18 and provide resistance to the rotation of cone nut 22 when the threads of cone nut 22 contact and are rotated onto the flutes 38. Accordingly, cone nut 22 is threaded onto threaded end 26 and is rotated onto the flutes 38 of the first resistance portion 30. The nut 22 is threaded until a predetermined distance, such as distance X, of the axle end 26 is left projecting rearwardly of the cone nut (see FIG. 1).

After cone nut 22 has been thus secured, the respective bearing structure 20 is seated against the inner race 29 of the cone nut. Hub body 12 is then slid onto axle 18 in the direction indicated by arrows 41. When the hub body 12 has been positioned, the other bearing structure 20 is seated within the outer race 19 of flange 16 and cone nut 24 is threaded onto the threaded end 28 of axle 18. The threads 42 of cone nut 24 match up with threads 43 on axle end 28, as discussed above, such that cone nut 24 moves easily over threaded end 28. The second resistance portion or section 32 is positioned adjacent threaded end 28. Cone nut 24 rotates and advances on end 28 until it reaches resistance portion 32. In one embodiment of the present invention, the second resistance portion 32 includes deformed threads 46 which offer resistance to the rotation of cone nut 24 and the interaction of the cone nut threads 42 with deformed threads 46. Resistance portion 32 may be formed by threading the threaded end 28 of axle 18 to a greater length than the threaded end 26. The section of threads corresponding to the increased length is then deformed such as by fluting the threads. One method of deforming the threads is discussed in Humlong U.S. Pat. No. 3,858,942 which is commonly owned with the present application.

When the cone nut 22 is rotated onto the flutes 38, the nut threads frictionally interact with the flutes. The frictional interaction locks the cone nut 22 onto the threaded end 26 and onto the first resistance portion 30. The first resistance portion 30 presents a certain magnitude of resistance to the rotation of cone nut 22 and provides a corresponding locking force which resists rotation of cone nut 22 any further along the length of the axle end 26. The locking force also keeps nut 22 on the end 26 once it has been threaded thereon.

The second resistance portion 32 also provides a magnitude of resistance to the rotation of cone nut 24. Cone nut 24 is thereby also locked onto the threaded end 28 of the axle 18. However, in accordance with the principles of the present invention, the deformed threads 46 of the second resistance portion 32 do not provide as great a magnitude of resistance to the rotation of cone nut 24 as do the flutes 38 of the first resistance portion to the rotation of cone nut 22. That is, the magnitude of resistance of the first resistance portion 30 is greater than the magnitude of resistance of the second resistance portion 32. This prevents the axle 18 from rotating when cone nut 24 is being threaded and locked onto the axle. For example, after cone nut 22 has been locked onto the axle, the cone nut is held stationary such as by its wrench flats 47. Cone nut 24 is then threaded onto end 28 after the hub body 12 and the bearing structures 20 have been positioned on the axle. When cone nut 24 meets resistance portion 32, the threads 42 will grip the deformed threads 46 and will produce a rotational force on axle 18. In the past, the rotational force thus produced by cone nut 24 is often great enough to produce rotation of the axle and thereby further thread the stationary cone nut 22 onto axle end 26. This extends the end 26 past cone nut 22 a greater distance than the predetermined distance X, and thus results in a hub where the axle ends are unequal. Furthermore, the increased threading increases the compressive forces on the respective bearing structures 20 hindering smooth movement of the bearing structure 20 in its races 19, 29.

However, in the present invention, the magnitude of resistance of the first resistance portion 30 is greater than the magnitude of resistance of the second resistance portion 32 and thereby, any rotational force applied to cone nut 24 will further thread the cone nut 24 onto threaded end 28 and onto resistance portion 32. The rotational force on axle 18 created by the friction between threads 42 of the cone nut 24 and the deformed threads 46 of the second resistance portion 32 will not be enough to overcome the frictional locking force of the threads of cone nut 22 on flutes 38 of the first resistance portion 30. Therefore, axle 18 will remain stationary and the cone nut 24 can be threaded onto end 28 a predetermined distance Y which is preferably the same as distance X. Furthermore, when the cone nuts are locked in position, the proper adjustment of the hub bearing structures is maintained during packing and shipping of the hub to the bicycle manufacturer, during the building of the wheel by the bicycle manufacturer, and during the shipping of the bicycle to the retailer.

While the described embodiment of the present invention utilizes resistance portions 30, 32 with different magnitudes of resistance and having flutes and deformed threads, other structures may be utilized to vary the resistance between the first and second resistance portions. For example, the first resistance portion 30 might include a bare, unfluted axle portion instead of the flutes 38. Nut 22 would then have to be threaded onto a bare axle which would provide great frictional resistance and strong locking of the cone nut 22 to the axle 18. Another embodiment of the present invention utilizes a first resistance portion having threads which have a different pitch than the threads of the respective threaded ends. The pitch of the first resistance portion threads would be configured accordingly to achieve the proper amount of frictional resistance to rotation of the cone nut to achieve the results of the present invention. Accordingly, the pitch of the threads making up the first resistance portion may be greater or lesser than the pitch of the threads on the respective threaded ends of the axle. Similarly, both resistance portions might utilize threads of different pitches, with the pitches chosen to produce a first resistance portion with a greater magnitude of resistance than the second resistance portion.

Figure 3:
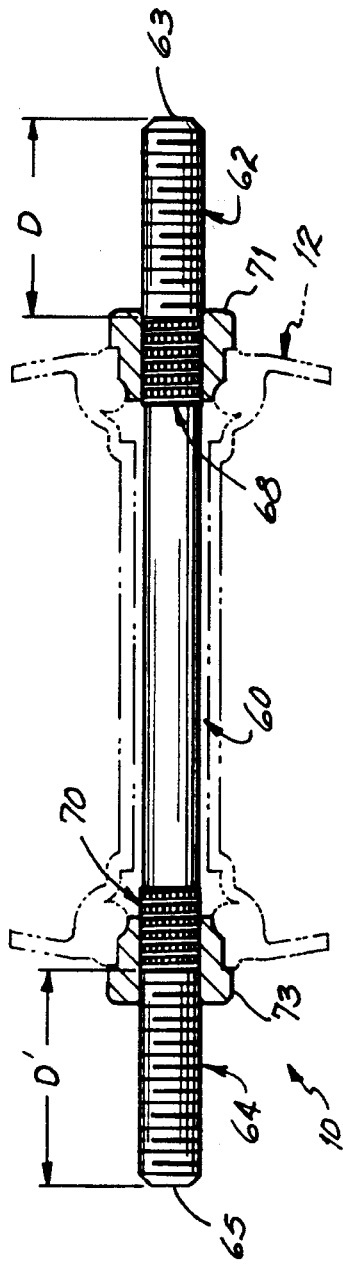
FIG. 3 is an alternative embodiment of the axle of the present invention.

FIG. 3 illustrates an alternative embodiment of the present invention. In the embodiment illustrated in FIG. 3, the differing magnitudes of resistance are created by spacing the resistance portions at different distances from the endmost points of the axle. More specifically, axle 60 includes threaded end portions 62 and 64 proximate first endmost point 63 and second endmost point 65, respectively. Each threaded end portion 62, 64 has associated therewith a resistance portion. A first resistance portion 68 is positioned adjacent threaded end portion 62. The first resistance portion 68 originates at a predetermined distance D from the first endmost point 63. A second resistance portion 70 is positioned adjacent threaded end portion 64 and originates at a distance D' from the second endmost point 65. In accordance with the principles of the present invention, the magnitude of resistance of the first resistance portion 68 must be effectively greater than the magnitude of resistance of resistance portion 70. This insures that a first cone nut 71 may be threaded onto end portion 62 and locked thereon, and a second cone nut 73 may be threaded onto end portion 64 and locked thereon without further rotating axle 60 and further threading the axle into first cone nut 71.

In the embodiment described in FIG. 3, the first predetermined distance D is less than the second predetermined distance D' such that first cone nut 71 threaded onto end portion 62 will encounter resistance portion 68 sooner along axle 60 than second cone nut 73 threaded onto end portion 64 will encounter the resistance of resistance portion 70 as illustrated in FIG. 3. That is, first cone nut 71 will only have to travel D to hit portion 68 while second cone nut 73 will have to travel D'. When both cone nuts 71, 73 are threaded onto the axle ends approximately equal distances, the first cone nut 71 will extend further onto resistance portion 68 than second cone nut 73 does on resistance portion 70. Thereby, first cone nut 71 may be threaded onto resistance portion 68 and locked thereon further than second cone nut 73 is threaded onto resistance portion 70. The magnitude of resistance encountered by the first cone nut on resistance portion 68 will then be greater than the magnitude of resistance encountered by second cone nut 73 on resistance portion 70. In this way, both the first and second resistance portions might be similarly formed on the respective ends of axle 60. That is, both of the resistance portions may include a radially projecting elongated flutes as illustrated in FIGS. 1 and 2. Moreover, both of the resistance portions might include deformed threads as shown in FIG. 3. Still further, the resistance portions may be created by other suitable methods and may take other suitable forms as discussed herein. Of course, the first and second resistance portions of FIG. 3 may still have different magnitudes of resistance from each other as discussed above with respect to FIGS. 1 and 2.

In still another embodiment of the present invention, thread locking chemicals might be added to the axle threads such that the magnitude of resistance of the first resistance portion 30 is greater than the magnitude of resistance of the second resistance portion 32. Moreover, the flutes disclosed for the first resistance portion 30 in FIGS. 1 and 2 might be utilized in the second resistance portion also except would be less radially pronounced from the axle and thereby would provide a lesser magnitude of resistance than that provided by the first resistance portion flutes.

While the present invention has been illustrated by the description of the embodiments thereof, and while the embodiments have been described in considerable detail, it is not the intention of applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

Having described our invention, we claim:

1. An axle for extending through the hub body of a bicycle wheel hub assembly having an improved cone nut locking mechanism comprising:

an elongated axle body having opposing ends with first and second endmost points;

a threaded end section formed on each opposing end of the axle body for threading cone nuts thereon;

a first resistance section formed on the axle adjacent one of the threaded end sections, the first resistance section configured for allowing a first cone nut to be rotated and threaded onto a portion of the resistance section;

a second resistance section formed on the axle adjacent the other threaded end section, the second resistance section configured for allowing a second cone nut to be rotated and threaded onto a portion of the resistance section;

the first and second resistance sections having greater magnitudes of resistance than the adjacent threaded end sections;

the first and second resistance sections operable for resisting said rotation and threading of a respective cone nut thereon, the first resistance section formed on the axle such that when said first cone nut is threaded onto the axle body a predetermined distance from the first endmost point it encounters a cumulative magnitude of resistance to threading greater than the cumulative magnitude of resistance to threading encountered by the second cone nut being threaded onto the axle body approximately the same predetermined distance from the second endmost point, such that the first cone nut may be threaded onto the first resistance section and locked thereon and the second cone nut may be subsequently threaded onto the second resistance section without rotating the axle body and further threading the first cone nut onto the first resistance section.

2. A front hub assembly of a bicycle wheel having an improved cone nut locking mechanism comprising:

a hub body having a bore formed therethrough;

an axle extending through said bore having threaded end sections for threading cone nuts thereon the axle further including first and second resistance sections formed adjacent the respective threaded end sections, each resistance section configured for allowing a cone nut to be rotated and threaded onto a portion of the resistance section and operable for resisting said rotation and threading thereon, the resistance sections having greater magnitudes of resistance than the adjacent threaded end sections, the magnitude of resistance of the first resistance section being greater than the magnitude of resistance of the second resistance section such that a first cone nut may be threaded onto the first resistance section a first predetermined distance and locked and a second cone nut may subsequently be threaded onto the second resistance section a second predetermined distance and locked generally without rotating the axle and further threading the first cone nut onto the first resistance section;

whereby cone nuts may be readily and efficiently threaded onto an axle predetermined distances and locked onto each end.

3. The front hub assembly of claim 2 wherein the first resistance section includes a plurality of elongated flutes projecting radially around the axle and oriented generally parallel to a longitudinal axis of the axle.

4. The front hub assembly of claim 2 wherein the second resistance section includes a plurality of deformed threads on the axle threaded end.

5. The front hub assembly of claim 4 wherein the deformed threads each have a deformed crest.

6. The front hub assembly of claim 2 further comprising ball bearing structures proximate each threaded end of the axle which are pressed into contact with the hub body and coupled with the axle by the cone nuts such that the hub body is rotatable around the axle.

7. An axle for extending through the hub body of a bicycle wheel hub assembly having an improved cone nut locking mechanism comprising:

an elongated axle body having opposite ends;

a threaded end section formed on each end of the axle body for threading cone nuts thereon;

a first resistance section formed on the axle adjacent one of the threaded end sections, the first resistance section configured for allowing a first cone nut to be rotated and threaded onto a portion thereof;

a second resistance section formed on the axle adjacent the other threaded end section, the second section configured for allowing a second cone nut to be rotated and threaded onto a portion thereof;

the first and second resistance sections resisting the rotation and threading of the cone nuts thereon and having greater magnitudes of resistance than the adjacent threaded end sections, the magnitude of resistance of the first resistance section to the first cone nut threaded thereon being greater than the magnitude of resistance of the second resistance section to the second cone nut such that a first cone nut may be threaded onto the axle body threaded end section and first resistance section a first predetermined distance and locked thereon and a second cone nut may subsequently be threaded onto the other threaded end section and second resistance section approximately a second predetermined distance and locked thereon without rotating the axle body and further threading the first cone nut onto the first resistance section generally beyond said first predetermined distance;

whereby cone nuts may be readily and efficiently threaded onto an axle body predetermined distances and locked on each end.

8. The axle of claim 7 wherein the first resistance section includes a plurality of elongated flutes projecting radially around the axle body and oriented generally parallel to a longitudinal axis of the elongated axle body.

9. The axle of claim 7 wherein the second resistance section includes a plurality of deformed threads on the axle threaded end section.

10. An axle for extending through the hub body of a bicycle wheel hub assembly having an improved cone nut locking mechanism comprising:

an elongated axle body having opposite ends with first and second endmost points;

a threaded end section formed on each end of the axle body for threading cone nuts thereon;

a first resistance section formed on the axle body adjacent one of the threaded end sections and configured for allowing a first cone nut to be rotated and threaded onto a portion thereof, the first resistance section originating at a first predetermined distance from the first endmost point to offer resistance to a first cone nut being threaded onto the axle body end;

a second resistance section formed on the axle body adjacent the other threaded end section and configured for allowing a second cone nut to be rotated and threaded onto a portion thereof, the second resistance section originating at a second predetermined distance from the second endmost point to offer resistance to a second cone nut being threaded onto the other axle body end;

the first and second resistance sections having greater magnitudes of resistance than the adjacent threaded end sections;

the first predetermined distance being less than the second predetermined distance so that the first cone nut encounters resistance while being threaded onto the one threaded end section at a distance from the first endmost point that is less than the distance from the second endmost point which the second cone nut encounters resistance while being threaded onto the other threaded end section such that the first cone nut may be threaded onto the first resistance section a predetermined length and locked thereon to provide a greater magnitude of resistance than the magnitude of resistance encountered by the second cone nut being subsequently threaded onto the second resistance section a similar predetermined length whereby to prevent rotation of the axle body and further threading of the first cone nut onto the first resistance section generally beyond said first length.

11. The axle of claim 10 wherein the first and second resistance sections include a plurality of elongated flutes projecting radially around the axle and oriented generally parallel to a longitudinal axis of the axle.

12. The axle of claim 10 wherein the first and second resistance sections portion include a plurality of deformed threads.

* * * * *